(12) United States Patent
Sathe et al.

(10) Patent No.: US 10,901,812 B2
(45) Date of Patent: Jan. 26, 2021

(54) MANAGING COMMUNICATION BETWEEN CLOUD AND HETEROGENEOUS DEVICES ACROSS NETWORKS

(71) Applicant: Rapyuta Robotics Co., Ltd, Tokyo (JP)

(72) Inventors: Dhananjay Sathe, Tokyo (JP); Gajamohan Mohanarajah, Tokyo (JP)

(73) Assignee: RAPYUTA ROBOTICS CO., LTD., Tokyo (JP)

( * ) Notice: Subject to any disclaimer, the term of this patent is extended or adjusted under 35 U.S.C. 154(b) by 217 days.

(21) Appl. No.: 16/012,701

(22) Filed: Jun. 19, 2018

(65) Prior Publication Data

US 2019/0089799 A1 Mar. 21, 2019

Related U.S. Application Data

(60) Provisional application No. 62/559,938, filed on Sep. 18, 2017.

(51) Int. Cl.
| | |
|---|---|
| *G06F 15/16* | (2006.01) |
| *G06F 9/54* | (2006.01) |
| *H04L 29/08* | (2006.01) |
| *G06F 8/35* | (2018.01) |
| *G06F 8/61* | (2018.01) |

(Continued)

(52) U.S. Cl.
CPC .............. *G06F 9/542* (2013.01); *G06F 8/35* (2013.01); *G06F 8/63* (2013.01); *G06F 8/71* (2013.01); *G06F 9/546* (2013.01); *G06F 11/3006* (2013.01); *G06F 11/3476* (2013.01); *H04L 12/2854* (2013.01); *H04L 41/082* (2013.01); *H04L 41/142* (2013.01); *H04L 41/5051* (2013.01); *H04L 41/5096* (2013.01); *H04L 63/101* (2013.01); *H04L 67/10* (2013.01); *H04L 67/12* (2013.01); *H04L 67/125* (2013.01); *H04L 67/2809* (2013.01); *H04L 67/34* (2013.01);

(Continued)

(58) Field of Classification Search
CPC ..... H04L 67/32; H04L 41/5096; H04L 67/12; H04L 67/2809; G06F 9/542; G06F 9/546; G06F 9/3476; G06F 11/3006
See application file for complete search history.

(56) References Cited

U.S. PATENT DOCUMENTS

| | | | |
|---|---|---|---|
| 10,659,419 B2 * | 5/2020 | Balasubramanian | ... G06F 40/30 |
| 10,742,760 B2 * | 8/2020 | Burns | ................ H04L 67/2828 |

(Continued)

*Primary Examiner* — Douglas B Blair
(74) *Attorney, Agent, or Firm* — Trupti P. Joshi

(57) ABSTRACT

A system and method to manage communication between a plurality of heterogeneous devices and a cloud has been described. A speaker communication property of a speaker node executing at one of the plurality of heterogeneous devices and the cloud in a first network is compared with a listener communication property of a listener node executing at another of the plurality of devices in a second network. A message-type agnostic listener proxy included in the first network is then generated based on the comparison. Next a message-type agnostic buffer including serialized message corresponding to a message sent by the speaker node is received at the first communication bridge in the first network. Finally, the message-type agnostic speaker proxy forwards the serialized message included in the message-type agnostic buffer to the listener node in the second network.

20 Claims, 8 Drawing Sheets

(51) Int. Cl.
*G06F 8/71* (2018.01)
*H04L 12/24* (2006.01)
*H04L 29/06* (2006.01)
*G06F 11/30* (2006.01)
*G06F 11/34* (2006.01)
*H04L 12/28* (2006.01)

(52) U.S. Cl.
CPC .... *G06F 2201/835* (2013.01); *H04L 41/0853* (2013.01); *H04L 63/0823* (2013.01)

(56) References Cited

U.S. PATENT DOCUMENTS

| | | | |
|---|---|---|---|
| 2009/0254217 A1* | 10/2009 | Pack | G06N 3/008 700/246 |
| 2012/0303746 A1* | 11/2012 | Yu | H04L 67/12 709/217 |
| 2014/0244768 A1* | 8/2014 | Shuman | G06Q 50/01 709/206 |
| 2015/0135197 A1* | 5/2015 | Budai | H04L 67/02 719/315 |
| 2017/0244657 A1* | 8/2017 | Baldwin | H04L 67/26 |
| 2018/0060153 A1* | 3/2018 | Innes | H04L 41/06 |
| 2018/0095467 A1* | 4/2018 | Perrone | B25J 9/1661 |
| 2018/0284735 A1* | 10/2018 | Cella | H04L 67/1097 |
| 2019/0268429 A1* | 8/2019 | Dresselhaus | H04L 67/26 |
| 2019/0297474 A1* | 9/2019 | Orsini | H04W 4/021 |
| 2019/0342170 A1* | 11/2019 | Pathak | H04L 67/10 |
| 2020/0021586 A1* | 1/2020 | Schmidt | H04L 12/66 |
| 2020/0213101 A1* | 7/2020 | Zimmerman | H04L 9/0637 |

* cited by examiner

MANAGING COMMUNICATION BETWEEN CLOUD AND HETEROGENEOUS DEVICES ACROSS NETWORKS

CROSS-REFERENCE TO RELATED APPLICATION

This application claims the benefit of U.S. Provisional Application No. 62/559,938, filed Sep. 18, 2017.

TECHNICAL FIELD

The present invention relates generally to field of communication between cloud and heterogeneous devices and more particularly to field of managing communication between cloud and heterogeneous devices across networks.

BACKGROUND

Cloud robotics and Internet-of-Things (IoT) are two areas that has seen transformational change in the last decade. In cloud robotics different robots and cloud work in collaboration to perform a task. Similarly, in IoT network different devices included in the IoT work in collaboration to perform a task. For example, a cloud robotics system may include a first robot to perform a task to determine obstacles in a warehouse and another robot that capture images within the warehouse. The first robot may provide the obstacle data to the second robot that may then use the data to navigate around the warehouse and capture images.

In order for the robots and cloud to work in collaboration, data has to be distributed between the different robots and between robots and cloud. Currently, robotics developers use robotics software frameworks, for example Robotics Operating System (ROS) and Open Robot Control Software (OROCOS) for building cloud robotics application. While these software frameworks provide several useful tools for building and executing complex cloud robotics application, these software frameworks do not provide a reliable solution for communication over wireless network or internet-WAN.

For example, ROS uses a fully connected graph approach for communication between devices. In ROS each network has a ROS master that manages communication between different applications executing at a robot in the network or between different robots in the same network. However, ROS does not support communication between robots or applications in different ROS networks that are managed by different ROS masters. In addition to the issue of a single ROS master, ROS also cannot handle dynamic switching network topologies and/or transient network failures of Internet-WAN. Further, ROS consumes an unnecessary amount of bandwidth and therefore can compromise the latency and reliability required for wireless network or internet-WAN.

Communication between robots and a cloud over a wireless network or internet-WAN is the backbone for the working of cloud robotics system. Therefore, the present robotics software framework are not suitable for cloud robotics related communication.

DETAILED DESCRIPTION

Embodiments of techniques to manage communication between cloud and heterogeneous devices across networks are described herein. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

The present disclosure describes a system for managing communication between plurality of heterogeneous devices and cloud/s across a plurality of networks. A device is an object or a physical entity having a unique identifier and an ability to transfer data over internet. In one embodiment, the device is a 'thing' in the Internet of Things (IoT). A thing, in the IoT context, refers to an entity or physical object that has a unique identifier, an embedded system, and the ability to transfer data over a network. These devices may include physical devices, home appliances, vehicles, edge devices, fog devices, etc. The device also includes robots that can perform actuation and sensing along with other device functionalities. Heterogeneous devices are devices, for example a robot, a sensor, and a cloud, are devices that have different computation, networking, and storage capabilities. A cloud is a collection of configurable system resources and services that can be rapidly provisioned with minimal management effort over a network, for example, Internet. The cloud provides several resources including computing power, database storage, and other IT resources.

The system manages the communication between the plurality of heterogeneous devices by providing a communication bridge in each of the network. The communication bridge acts as a gateway for transmitting and receiving communication for the different devices and cloud within the network. The communication bridge may also be programmed to provide fine-grain control during communication of messages via the communication bridge. The system also includes a communication broker that is connected to the different communication bridges in the different networks. The communication broker manages the communication by being a gateway that exchange communication between different communication bridges. The network of communication bridges and the communication broker therefore allows to easily establish communication between the devices and cloud in different network.

In one embodiment, the communication bridge is a system component that communicates both with nodes in a network and the communication broker to manage communication from and to the network.

Figure 1:
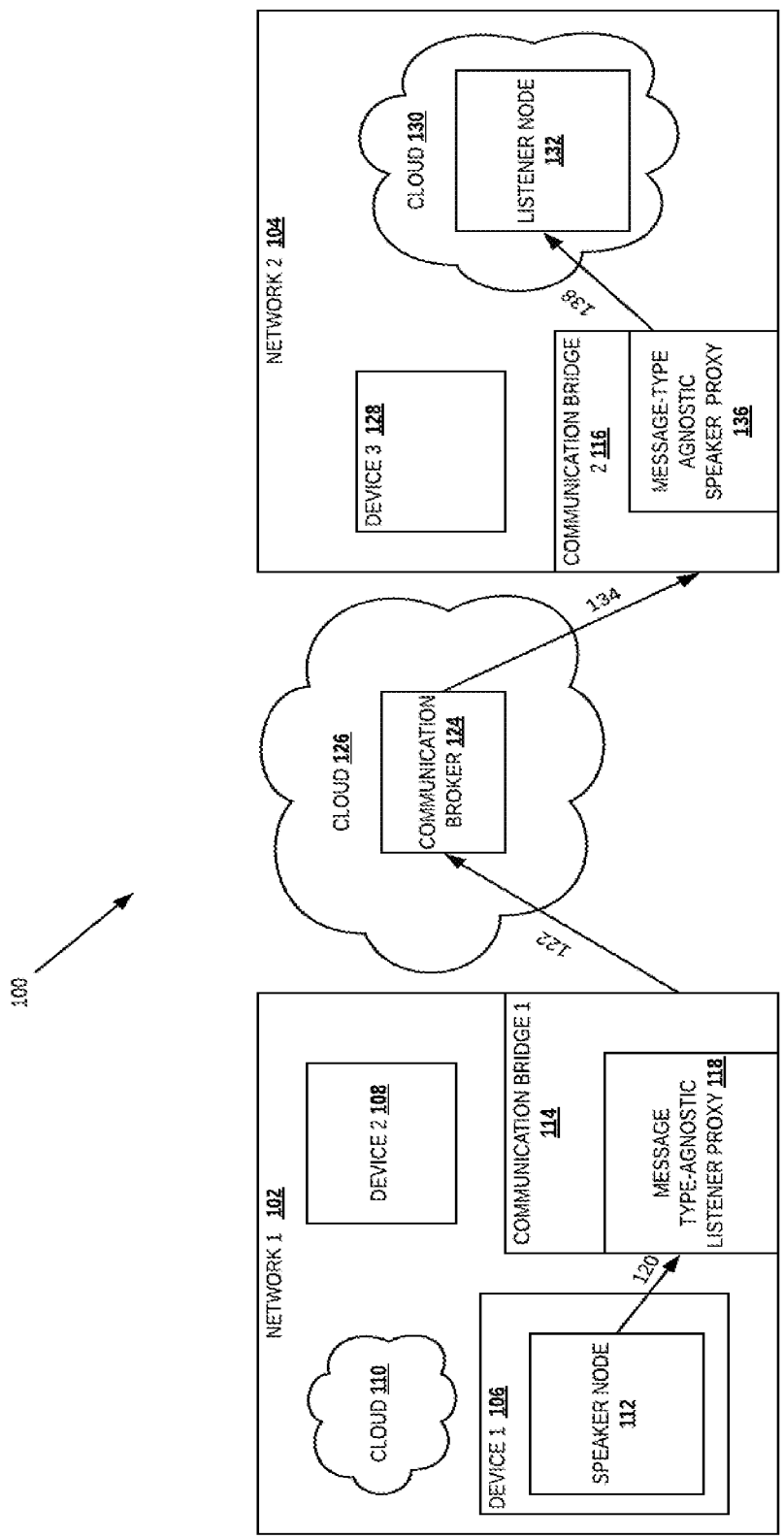
FIG. 1 is a flow diagram illustrating a process 100 for communication between cloud and heterogeneous devices across networks, according to an embodiment.

FIG. 1 is a flow diagram illustrating a process 100 for communication between cloud and heterogeneous devices across networks, according to an embodiment. As shown, two networks are shown, network 1 102 and network 2 104. A network may include several heterogeneous devices and/or cloud. A network is a collection of communication manager and nodes that are 'managed' by the communication manager. The different nodes managed by the communication manager register with the communication manager and exchange messages with each other by advertising at the communication manager. For example, the network may be a ROS network or a ROS environment that includes a ROS master and several ROS nodes that register at the ROS master and advertise topics to the ROS master for establishing communication between the different ROS nodes in the ROS network.

A node is an executable that executes at a machine, for example, a robot, or a cloud included in the network to execute a particular action. For example, a node executing at a robot may control a laser rangefinder, another node may execute to control the robot's wheel motors, etc. As shown in FIG. 1, the network 1 102 includes two devices, device 1 106 and device 2 108, and a cloud 110. A node can be deployed in the device 1 106, device 2 108, or the cloud 110. In one embodiment, a speaker node 112 is deployed at device 1 106. The speaker node 112 is a node that sends message to a communication mechanism. For example, the node may be executing at an Unmanned Aerial Vehicle (UAV) to capture images at a warehouse. The node may send the captured images (message) of the warehouse to a communication mechanism that allows the supplier nodes in other networks to retrieve the message.

A message is a data structure, comprising typed fields. Each message has a message type that can be, for example, integer, floating point, boolean, etc. The node may use any of the communication mechanisms for receiving or sending messages. For example the communication mechanism may be a publisher-supplier communication mechanism or a request-reply communication mechanism for sending and receiving messages from the node. ROS provides three communication mechanisms: topic (publisher-subscriber communication mechanism), service (request-reply communication mechanism), and action (goal, feedback, result communication module) that can be used to send or receive messages. Each communication mechanism being used to send a message is tied to the message type of the message being sent over the communication mechanism and a receiving node can receive messages corresponding to only that message type. For example, when a sender node is publishing a name message of type "string" at a "robot name" topic then a subscriber node subscribing to the "robot name" topic can only receive messages of type "string".

The system 100 includes communication bridges deployed in each of the networks. A communication bridge act as a transmitter or receiver of message for a node included in one network to a node included in another network. As shown in FIG. 1, a communication bridge 1 114 is deployed in network 1 102 and a communication bridge 2 116 is deployed in network 2 104. A communication bridge is a component that can communicate with nodes in the network at one end and a communication broker at other end.

Next the communication bridge 1 114 generates a message-type agnostic listener proxy 118 to receive 120 message from the speaker node 112. The message-type agnostic listener proxy 118 wraps the speaker node 112 functionality and ensures reliable communication channel to and from the speaker node 112. The generated message-type agnostic listener proxy 118 is a message type-agnostic proxy, i.e., a proxy that can receive message of any message type. The message-type agnostic listener proxy 118 then receives 120 a speaker communication property from the speaker node 112. The speaker communication property includes communication mechanism name of the communication mechanism where the message can be subscribed or received, for example topic name, service name, or action name where the message can be received from the speaker node 112. The speaker communication property also includes the message type of the message published or sent at the communication mechanism corresponding to the speaker node 112. For example, a speaker specific communication mechanism may include a topic name: topic/foo of the topic where the speaker publishes message and message type "string" of the message published at the topic/foo.

Next the communication bridge 1 114 in the network 1 102 advertises 122 the speaker communication property of the speaker node 112 to the communication broker 124 at cloud 126. In one embodiment, the communication broker 124 is a message broker that manages routing of messages between the communication bridges 1 114 and 2 116, respectively. The communication broker 124 and the communication bridges 1 114 and 2 116 may be implemented using the Advanced Message Queuing Protocol (AMQP). In this case the communication broker 124 is a RabbitMQ message broker implemented by Advanced Message Queuing Protocol (AMQP). AMQP provides several advantages including different compression options for compressing the message being transmitted from one communication bridge to another communication bridge. This helps in reducing the amount of data transmitted between communication bridges and broker.

The network 2 104 can also include several devices and cloud, for example, device 3 128 and a cloud 130. A listener node 132 is deployed at the cloud 130. After the listener node 132 is deployed in the network 2 104 then the communication bridge 2 116 in the network 2 104 communicates with the communication broker 124 to inform about the newly deployed listener node 132 and to request information for the advertised speaker communication property at the communication broker 124. The communication broker 124 then sends 134 the advertised speaker communication property to the communication bridge 2 116. The communication bridge 2 116 then checks whether the advertised speaker communication property of the speaker node 112 matches with the listener communication property of the listener node 132. As discussed above, a speaker communication property includes a communication mechanism name used for transmitting the message and a message type of the message that can be received at the communication mechanism name.

The listener communication property of the listener node 132 may include the name of communication mechanism from which the listener node 132 receives messages and the message type of the messages that the listener node 132 can receive over the communication mechanism name. For example, a camera node in a first network may be publishing images at topic: /image that have message type: std_msg/string. In this case, the camera node has topic: /image and message type: std_msg/string as listener communication property. An image viewing node in a second network has listener communication property including a name of the topic: /image that the image viewing node wants to subscribe and message type: std_msg/string of the message that the topic: /image can receive. In this case the camera (speaker node) communication property, topic: /image and message type: std_msg/string, matches with the "image viewing" node (listener node).

In case the speaker communication property matches the listener communication property then the communication bridge 2 116 in network 2 104 generates a message-type agnostic speaker proxy 136. Next, the speaker node 112 sends 120 the message to the message-type agnostic listener proxy 118 that forwards the message to the communication broker 124. The communication broker 124 forwards 134 the message to the speaker proxy 136 that finally forwards 138 the message to the listener node 132.

The present invention therefore allows communication between devices and cloud in different networks over WAN or wireless-internet using the communication bridges in each network and communication broker to allow inter-network communication.

Figure 2:
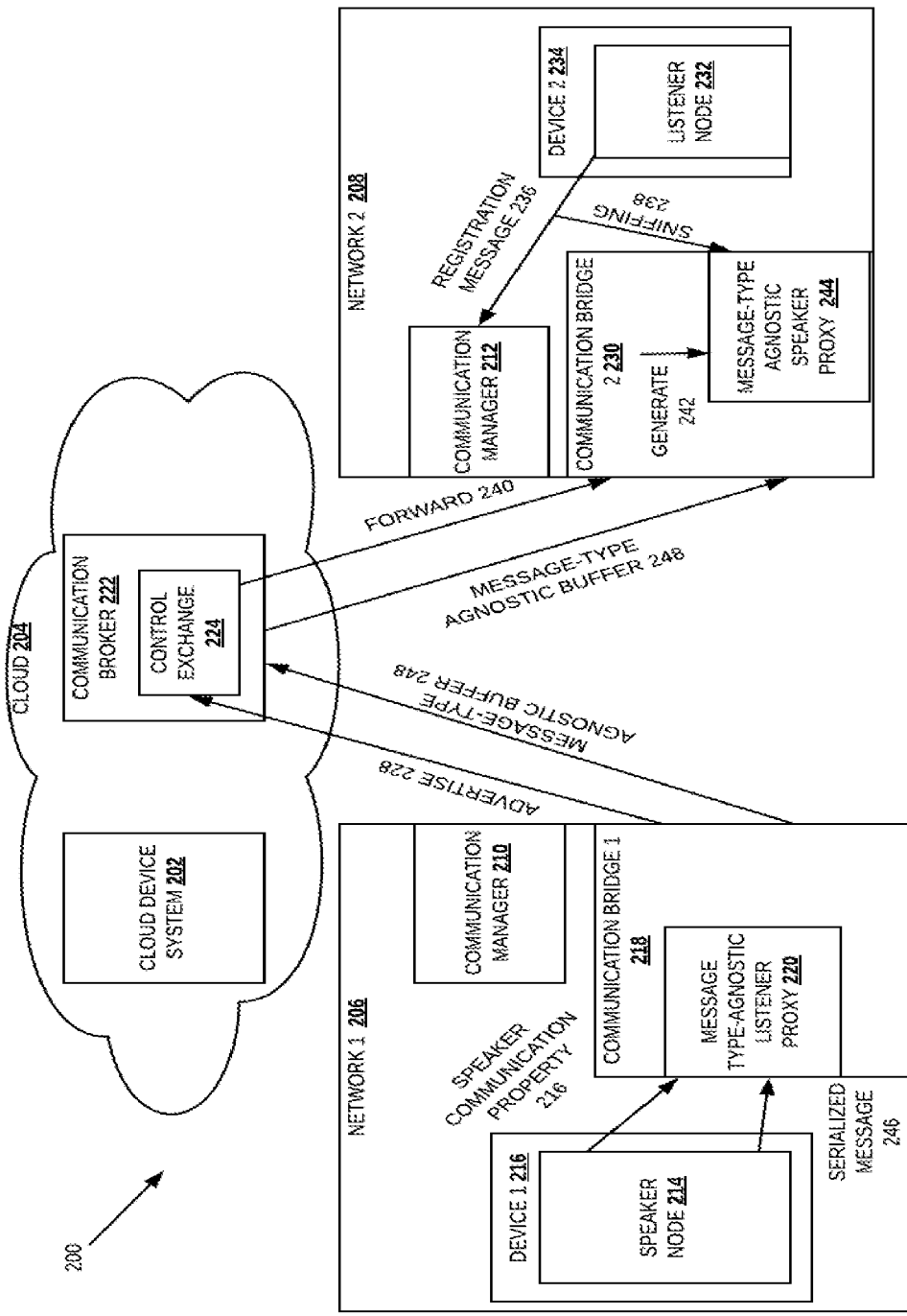
FIG. 2 is a detailed flow diagram illustrating a method 200 for communication between cloud and heterogeneous devices across networks, according to an embodiment.

FIG. 2 is a detailed flow diagram illustrating a method 200 for communication between cloud and heterogeneous devices across networks, according to an embodiment. One of the primary issues that devices or cloud components have with communication over wireless network or internet-WAN is the limited network bandwidth at these networks. The current disclosure solves this issue by allowing a user to define a whitelist of the communication mechanism names that can be transmitted across a particular communication bridge. This prevent data flooding by communication mechanisms that are not important and allows a user to maintain optimum bandwidth when communicating over wireless network or internet-WAN.

Further, different communication mechanism names may have different purposes. The communication mechanism names allows a user to have a fine-grain control over the different communication mechanisms. For example, the user may want a delivery guarantee for one communication mechanism and a high throughput, with or without packet loss, for another communication mechanism. The present disclosure allows a user to define fine-grain control to set different parameters, such as Quality of Service (QoS), compression, time_to_live (ttl) etc. individually for the different communication mechanisms. For example, the user may set a high throughput for a "real-time temperature" communication mechanism and a delivery guarantee for a "robot error logs" communication mechanism.

A cloud device system 202 at cloud 204 allows a user to provide values for a set of tunable communication mechanism parameters of a communication bridge. The provided values corresponding to these tunable communication mechanism parameters manages communication of messages using communication bridge over WAN. The tunable communication mechanism parameters includes a communication mechanism name whitelist that includes the name of communication mechanisms, for example topics, services, and actions names in ROS, that are allowed to transmit data using the communication mechanism. The communication mechanism may include a publisher-subscriber communication mechanism or a request-reply communication mechanism. The communication bridge parameters also include details of the compression mechanism that are used to compress a message before sending it to the communication broker.

The cloud device system also allows the user to define several fine-grained communication mechanism parameters for a particular communication mechanism name. For example, the cloud device system allows a user to set a QoS for each communication mechanism name. The cloud device system also allows user to select time_to_live (ttl) per communication mechanism, max_buffer_length, and buffer_flush_interval for each communication mechanism. Setting these parameters allows the user to deal with buffer bloat and dropped messages during communication of the message over the WAN. In one embodiment, a node and a communication bridge generated based on the communication bridge parameters are then deployed at a cloud or a device in the network.

As shown in FIG. 2, the system includes two networks, a network 1 206 and a network 2 208. Each of the networks 206 and 208 have a communication manager 210 and 212, respectively, which controls communication between nodes within the same network. A communication manager provides naming and registration service to nodes within a network. For example, in ROS the communication manager is a ROS master that manages ROS nodes in a ROS environment. A speaker node 214 is deployed at a device 1 216 at network 1 206. Next a communication bridge 1 218 at the network 1 206 is launched when the speaker node 214 is deployed at the device 216 in the network 1 206. As discussed in FIG. 1, the communication bridge 1 218 generates a message type-agnostic listener proxy 220 for the communication bridge 1 218. The communication bridge 1 218 then sends a registration request to communication broker 222 to register the communication bridge 1 218. The communication broker 222 then sends a reply to the communication bridge 1 218 indicating success/failure of registering the communication bridge 1 218 at the communication broker 222. The communication broker 222 includes a control exchange 224 that receives and sends advertised and published messages to the communication bridges. The communication bridge 1 218 binds to the control exchange 224 at the communication broker 222.

Next the speaker node 214 in the network 1 206 sends a speaker communication property 216 to the message-type agnostic speaker proxy 220. The speaker communication property includes the communication mechanism names where the messages from speaker node 214 are available, for example in case of ROS the topic name, service name, or action names at which the message is published. The speaker communication property also includes a message type data that includes the message type of the message transmitted by the speaker node 214.

Next the message-type agnostic listener proxy 220 advertises 228 the speaker communication property at the control exchange 224 of the communication broker 222. For example consider that the speaker node 214 is a camera image capturing device that publishes "camera images" of type string to a topic "camera_image". In this case, the advertised speaker communication property includes:

```
{ op: "topic advertisement";
        topic: "camera_image";
        msg_type: "string";
}
```

Next a communication bridge 2 230 in a network 2 208 registers with the communication broker 222 and binds with the control exchange 224. When a listener node 232 is deployed at a device or cloud, for example device 234, in network 2 208 then the listener node 232 sends a registration message 236 to a communication manager 212 at the network 2 208. The registration message 236 includes the listener communication property of the listener node 232. The listener communication property includes communication mechanism names at which the listener node receives messages, and the message type of the messages that can be received at the listener node.

In one embodiment, the communication bridge 2 230 sniffs 238 the registration message during its transmission from the listener node 232 to the communication manager 212. Sniffing is the process of monitoring and capturing packets passing through a given network. Based on the sniffing 238, the communication bridge 2 230 determines the listener communication property of the listener node 232 in the network 2 208. The communication bridge 2 230 then sends a request to retrieve a list of advertised speaker communication property from the control exchange 224 at the communication broker 222. Based on the received request, the control exchange 224 forwards 240 the advertised speaker communication property to the communication bridge 2 230 at network 2 208. The communication bridge 2 230 then checks if the retrieved advertised speaker communication property is same as the retrieved listener communication property. The communication bridge 2 230 generates 242 a message-type agnostic speaker proxy 244 at the communication bridge 2 230 when the received speaker communication property is same as the listener communication property obtained from sniffing the listener node registration message.

In the above example of "camera image" topic the listener node 232 at the network 2 208 may be an image processing node that has a listener communication property including a topic "camera_image" and msg_type: "string". In this case, the listener communication property of the image processing node is same as the speaker communication property of the camera node. Therefore, a message-type agnostic speaker proxy 244 is generated at the communication bridge 2 222.

Next, after the a message-type agnostic speaker proxy 244 is generated at the network 2 208, the speaker node 214 initiates sending of a message to the listener node 232. In one embodiment, the speaker node 214 serializes the message to obtain a serialized message. Serialization is the process of translating data structures or object state into a format that can be stored (for example, in a file or memory buffer) or transmitted (for example, across a network connection link). In one embodiment, serialization is the process of converting an object into a stream of bytes to store the object or transmit it. The speaker node 214 transmits the serialized message 246 to the message-type agnostic listener proxy 220. In one embodiment, the received serialized message 246 is copied to a buffer at the message-type agnostic speaker proxy 220 to obtain a message-type agnostic buffer including the serialized message. As the speaker proxy is message-type agnostic serialized message of any message-type can be received at the speaker proxy. Table 1 illustrates a message type-agnostic buffer including serialized message bits.

TABLE 1

| VI | V2 | V3 | V4 |
|----|----|----|----|

As shown, the message-type agnostic buffer includes the serialized message bits V1, V2, V3, and V4. Each serialized message bit of the serialized message has a position in the buffer that is represented by a bit position identifier. For example in the message-type agnostic buffer of Table 1, the bit position V1 is P1, V2 is P2, V3 is P3, and V4 is P4. In one embodiment, the serialized message bit is compressed at the message-type agnostic listener proxy 220 before copying it to the buffer. The serialized message may be compressed using a compression mechanism defined for the communication mechanism name at which the serialized message is received.

Next the communication bridge 1 218 initiates sending of the message-type agnostic buffer 248 to the communication broker 222. At the communication bridge 1 218, a check may be performed to determine whether the communication mechanism name used to send the serialized message by the speaker node 214 is not in the whitelist of communication mechanism names defined for the communication bridge 1 218. In case the communication mechanism name is in the whitelist then the message-type agnostic buffer 248 is sent to the communication broker 222. The communication broker 222 then forwards the message-type agnostic buffer 248 to the speaker proxy 244 at the communication bridge 2 230. In one embodiment, the different message-type agnostic buffers are processed according to the QoS parameter, time_to_live (ttl), max_buffer_length, and buffer_flush_interval for the different communication mechanism name.

[0040] In one embodiment the serialized message bits of a message may be included in several message-type agnostic buffers. For example, a message may be converted to a serialized message having 20 bits. These message bits may be included in 4 message-type agnostic buffers each having 5 bits or the 4 message-type agnostic buffers may have different count of bits that add up to 20 bits. As the different buffers may be received in different order, the message-type agnostic speaker proxy 244 may receive the serialized message bits in an incorrect order. The waits for receiving the serialized bits of message in the correct order. The message-type agnostic speaker proxy 244 waits to receive the missing bit in the incorrect order of bits till the received number of bits at the message-type agnostic speaker proxy 244 reaches a max_buffer_length set at the cloud device system 202 for the communication bridge 2 230. Similarly, when a message-type agnostic buffer includes a message "temperature data" for a topic name/sensor_reading that has a high QoS then the speaker proxy 244 waits for a certain time period to receive all the bits of the message-type agnostic buffer including the "temperature data".

Next the speaker proxy 244 determines whether the received serialized message bits in the message-type agnostic buffers are compressed. In case the serialized message bits are compressed then the speaker proxy 244 decompress the serialized message bits and forwards the serialized message bits to the listener node 232.

In one embodiment, the different serialized message bits received from two or more message-type agnostic buffers may not be received in the correct order. In case, the message bits is not received in the correct order then the speaker proxy 244 selectively forwards the serialized message bits to the listener node 232. For example, consider that a serialized message has four serialized message bits P1-P4, where bits P1-P2 are included in a first buffer, P3 is included in a second buffer and P4 is included in a third buffer. Assume that first buffer with bits P1-P2 are received first, followed by third buffer including bit P4, and finally second buffer including bit P3 is received. In this case, the speaker proxy 244 forwards the bits P1-P2 to the listener node. When the speaker proxy 244 receives the bit P4 next then it waits to receive the bit P3 as bit P3 is received out of order. After bit P3 is received the speaker proxy 244 forwards bits P3 and P4. [0043] The listener node 232 finally deserialize the serialized message to obtain the message. As the serialization and deserialization of messages occur at the speaker and listener nodes the message (message-type agnostic buffer including serialized message bits) transmitted between the speaker and listener proxy is decoupled from message meta-data with minimal frame overhead per message and no intermediate serialization. This ensures optimal use of the network bandwidth during the transmission of messages over the wireless network or internet-WAN.

In one embodiment, the communication bridge delivering messages of a speaker node needs to send the message (message-type agnostic buffer including serialized message bits) only once to the communication broker 222 over wireless network or internet-WAN. The communication broker then ensures delivery of the message to all communication bridges delivering messages to the listener node.

Figure 3:
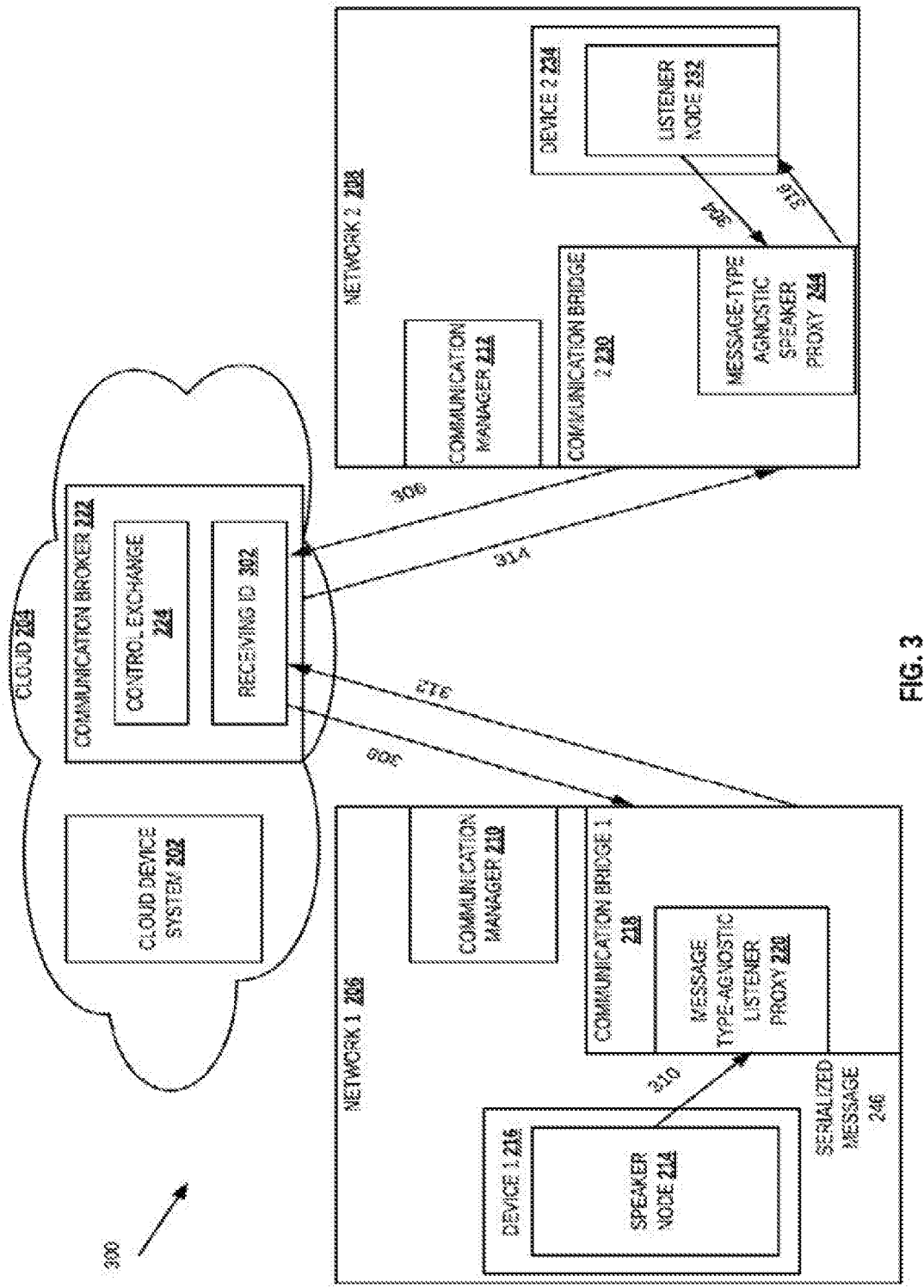
FIG. 3 is a detailed flow diagram illustrating a method for request-reply based communication between the speaker node in network 1 and listener node in network 2 of FIG. 2, according to an embodiment.

FIG. 3 is a detailed flow diagram illustrating a method 300 for request-reply based communication between the speaker node 214 in network 1 206 and listener node 232 in network 2 208 of FIG. 2, according to an embodiment. Request-reply communication involves a pair of communications including: a request message by a node to another node and a reply message from the another node to the node that includes the requested message.

In order to communicate between the speaker node 214 in network 1 206 and listener node 232 in network 2 208 using a request-reply communication, the message type-agnostic listener proxy 220 advertises the speaker communication property at the exchange in the communication broker. In one embodiment, the generated listener message type-agnostic listener proxy also publishes a receiving id 302 where the message-type agnostic listener proxy 220 provides data/message requested by the listener node 232. Next at the network 2 208, the speaker proxy 244 receives a request 304 for message from the listener node 232.

Based on the received request, the speaker proxy 244 sends a request 306 at the receiving id 302 of the communication broker 222. The communication broker 222 then sends a request 308 to the message-type agnostic listener proxy 220 for receiving the message based on the receiving id 302. Based on the received request, the message-type agnostic listener proxy 220 requests and receives 310 the serialized message from the speaker node 214. The message-type agnostic listener proxy 220 then sends the message type-agnostic buffer as a reply message 312 from the message-type agnostic listener proxy.

Next the receiving id 302 sends the message type-agnostic buffer to the message type-agnostic speaker proxy 244 as a reply message 314 for the received request 304. Finally the serialized message in the received message type-agnostic buffer is sent 316 to the listener node 232. At the listener node 232, the received message-type agnostic buffer is de-serialized to obtain the requested message.

Figure 4:
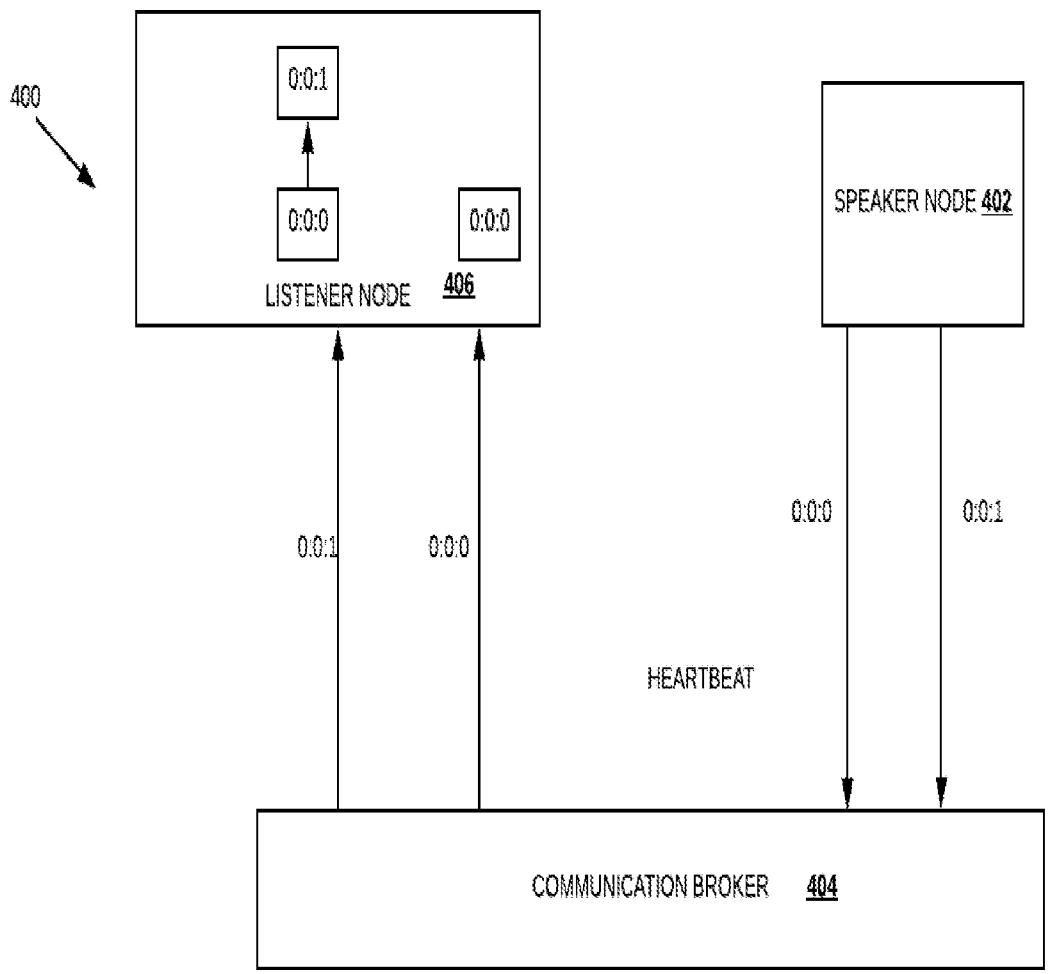
FIG. 4 is an exemplary flow diagram illustrating an anti-entropy gossip protocol implementation to synchronize speaker message property at listener node, according to an embodiment.

FIG. 4 is an exemplary flow diagram 400 illustrating an anti-entropy gossip protocol implementation to synchronize speaker message property at listener node, according to an embodiment. Anti-entropy protocol is a process for repairing replicated data by comparing replicas and reconciling differences. In case of nodes, the anti-entropy gossip protocol compares the speaker communication property received from the different listener nodes with the speaker communication property at the listener node and based on an identified mismatch re-sends the message to the particular listener node.

In this case, the speaker node transmits a "heartbeat" signal, at regular intervals, that includes the speaker communication property including the different communication mechanism names, for example, topic, service, or action names and current state, at which the speaker node is transmitting messages. The different listener nodes compare the received speaker communication property with the previously seen speaker communication property at the listener node. In case of a mismatch, the listener node updates the speaker communication property with the latest received speaker communication property thus resolving the inconsistencies.

As shown in FIG. 4, speaker node 402 sends a speaker communication property, represented by a tuple of three integers, to the communication broker 404. The communication broker 404 then forwards the speaker communication property to the listener node 406 that updates the speaker communication property entry stored at the listener node 406, in case of a mismatch. During the first heartbeat transfer, the speaker node 402 sends a speaker communication property represented by "0:0:0" to the listener node 406. As the listener node 406 stores the speaker communication property as "0:0:0", the speaker communication property at the listener node 406 is not updated.

Next, the speaker node 402 sends a speaker communication property as "0:0:1", in the next heartbeat, to the listener node 406. In this case, as the listener node 406 stores "0:0:0", a mismatch is identified, and the listener node 406 is updated with the latest speaker communication property "0:0:1".

Figure 5A:
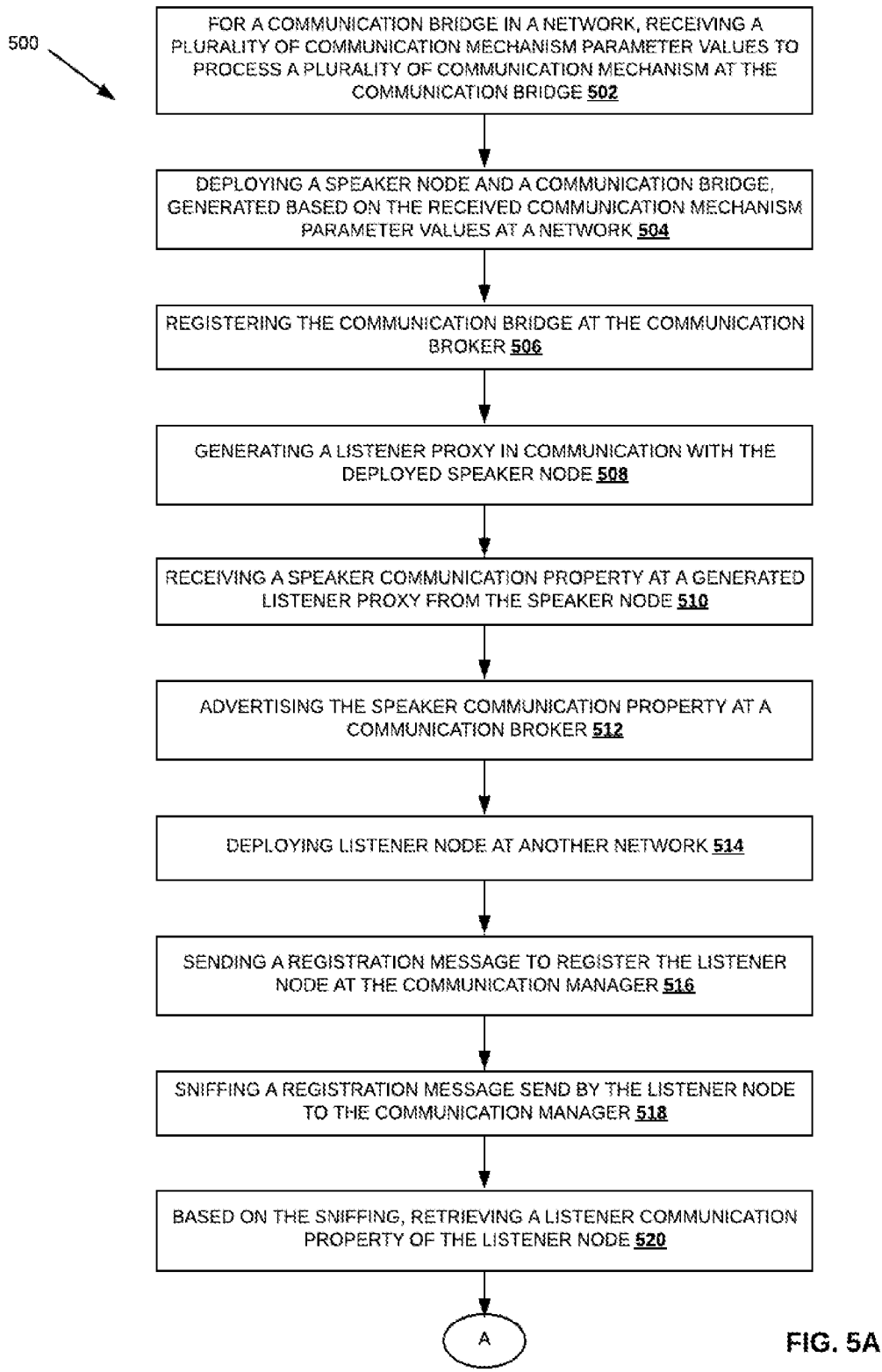
FIGS. 5A-C are flow diagrams illustrating a process for communication between cloud and heterogeneous devices, according to an embodiment.
Figure 5B:
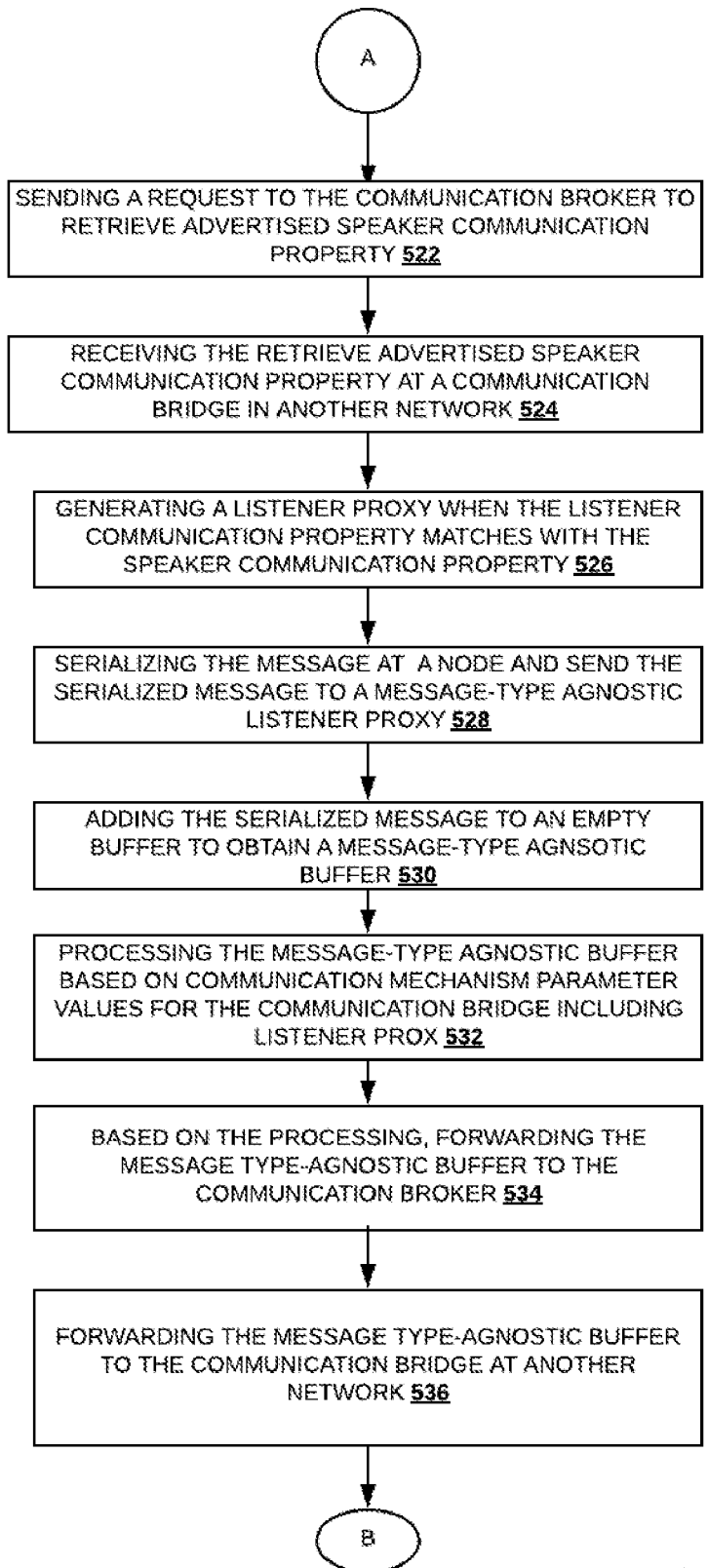
Figure 5C:
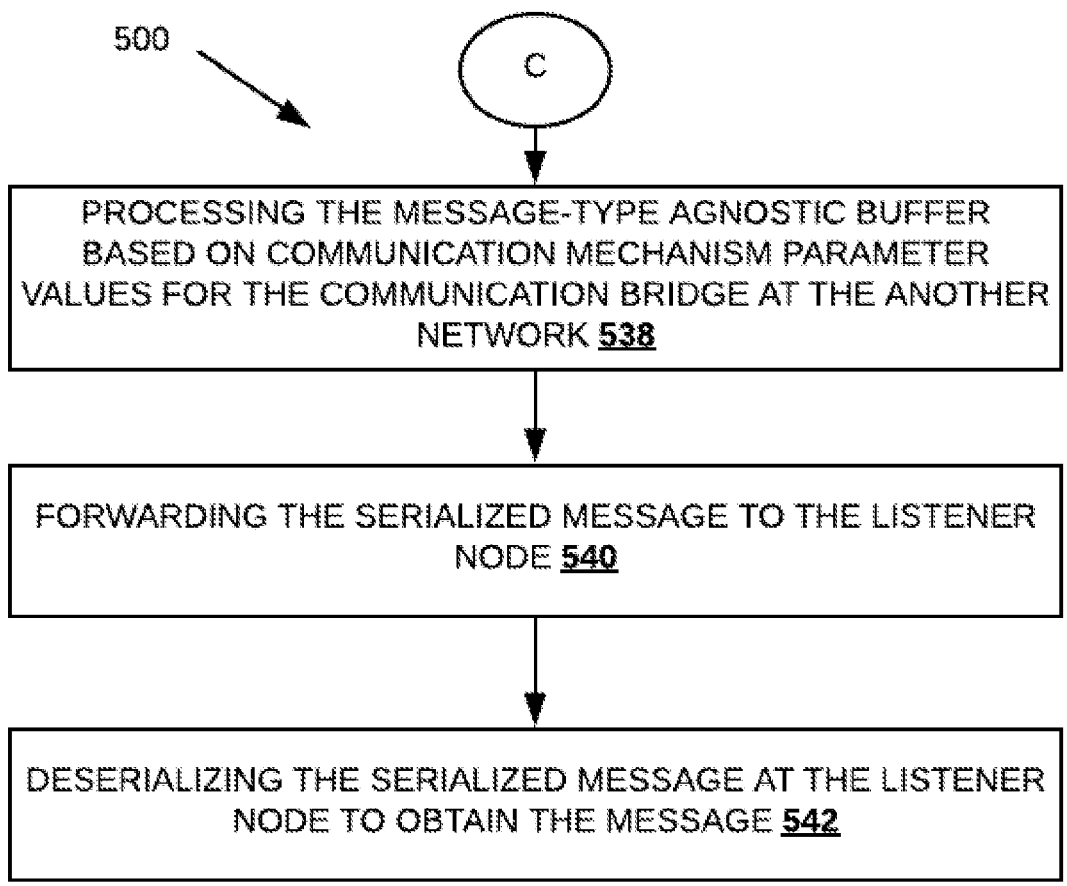

FIGS. 5A-5C are a flow diagram illustrating a process 500 for communication between cloud and heterogeneous devices, according to an embodiment. Initially at 502, a plurality of communication mechanism parameter values to process a communication mechanism at a communication bridge is received. The plurality of communication mechanism parameter values include whitelist of communication mechanism names that are allowed at the communication bridge. The plurality of communication mechanism parameter values also include values for QoS, ttl, max_buffer_length, and buffer_flush_interval parameter values that are applied by the communication bridge on messages received from a particular communication mechanism.

Next a speaker node and a communication bridge, generated based on the received plurality of communication mechanism parameter values, are deployed at a network (504). Next the deployed communication bridge is registered at a communication broker (506). After the registration process, the communication bridge binds to a control exchange. Next the communication bridge generates a listener proxy that is in communication with the deployed speaker node (508).

Next a speaker communication property is received at a generated listener proxy from the speaker node (510). The speaker communication property includes the communication mechanism names and message type for the speaker node. The listener proxy then advertises the speaker communication property at the communication broker (512).

Next a listener node is deployed at another network (514). The listener node then sends a registration message to register the listener node at a communication manager of the another network (516). The existing deployed communication bridge sniffs the registration message during its transmission from the listener node to the communication manager (518). Based on the sniffing, the communication bridge retrieves a listener communication property from the registration message (520).

The communication bridge at the another network then sends a request to the communication broker for retrieving the advertised speaker communication property (522). Based on the request, the communication bridge receives the retrieved speaker communication property (524). Next a speaker proxy in communication with the listener node is generated for the communication bridge at the another network when the listener communication property matches with the speaker communication property (526).

Next the speaker node in the network serialize a message and send it to the message-type-agnostic listener proxy (528). At the communication bridge at the another network, the message is added to an empty buffer to obtain a message type-agnostic buffer (530). Next the message-type agnostic buffer is processed based on communication mechanism parameter values for the communication bridge including the listener proxy (532). Processing the message-type agnostic buffer includes analysing whether the buffer is being published at a communication mechanism name, for example ROS topic name, that is not in the whitelist. The message type-agnostic listener proxy forwards the message type-agnostic buffer to the communication broker (534). Next the communication broker forwards the message type-agnostic buffer to the speaker proxy (536). Next the received message-type agnostic buffer is processed based on communication mechanism parameter values for the communication bridge including the speaker proxy (538). Next the speaker proxy forwards the serialized message included in message type-agnostic buffer to the listener node (540). At the listener node the serialized message is de-serialized to obtain the message (542).

Figure 6:
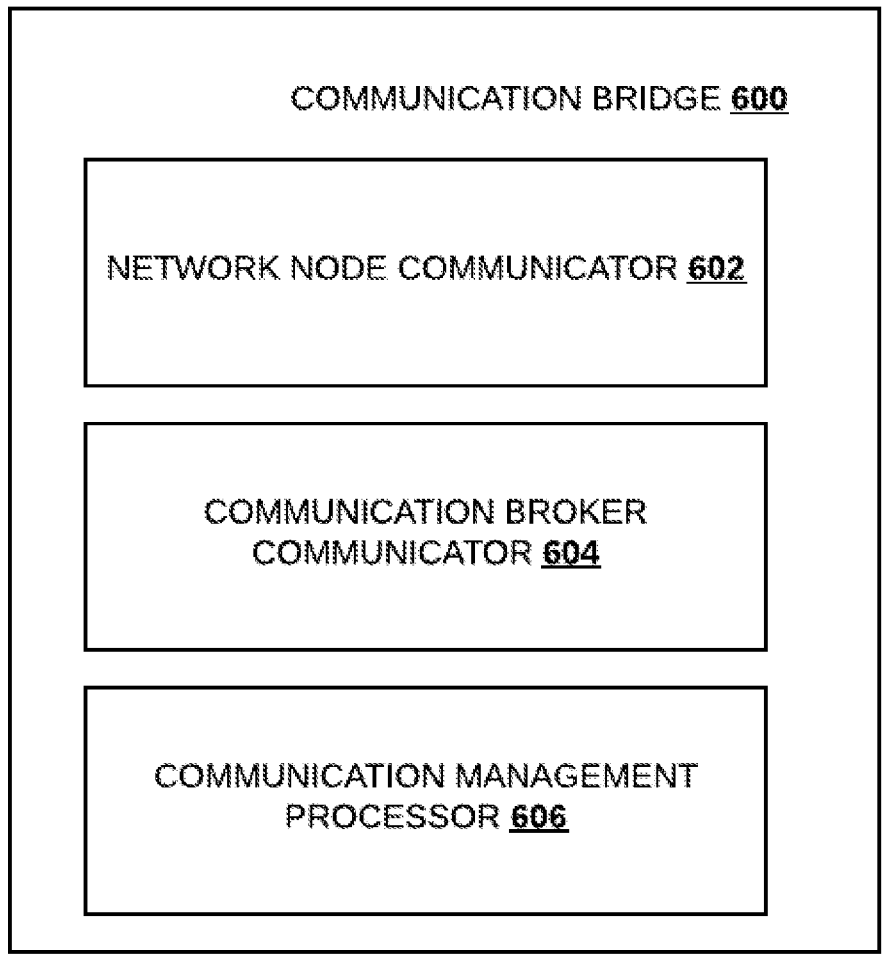
FIG. 6 is a system diagram illustrating a communication bridge, according to an embodiment.

FIG. 6 is a system diagram illustrating a communication bridge 600, according to an embodiment. The communication bridge 600 includes a network node communicator 602 that communicates with the different network components, for example nodes deployed at devices and cloud. In one embodiment, the network node communicator communicates with the different nodes using one or more node specific or network specific protocols. The communication bridge 600 also includes a communication broker communicator 604 that communicates with a network broker to transmit data to a node in another network. The communication bridge 602 also includes a communication management processor 604 that manages the processing and transfer of data to the node or the communication broker.

The foregoing diagrams represent logical architectures for describing processes according to some embodiments, and actual implementations may include one or more components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code read from one or more of non-transitory computer-readable media, such as a floppy disk, a CD-ROM, a DVD-ROM, a Flash drive, a magnetic tape, and solid state Random Access Memory (RAM) or Read Only Memory (ROM) storage units and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Embodiments described herein are solely for the purpose of illustration. Those in the art will recognize other embodiments may be practiced with modifications and alterations to that described above.

The invention claimed is:

1. A computer implemented method for managing communication between a plurality of heterogeneous devices across a plurality of networks and a communication broker in a cloud, the method comprising: at a first communication bridge in a first network, comparing a speaker communication property of a speaker node executing at one of the plurality of heterogeneous devices in the first network with a listener communication property of a listener node executing at another of the plurality of heterogeneous devices in a second network; based on the comparison, generating a message-type agnostic listener proxy included in the first network; serializing a message at the speaker node in the first network to obtain a serialized message; at the first communication bridge in the first network, copying the serialized message to a message-type agnostic buffer; adding at least one or more serialized message bits to the message-type agnostic buffer; forwarding the serialized message included in the message-type agnostic buffer to the communication broker in the cloud; at the communication broker in the cloud, forwarding the serialized message included in the message-type agnostic buffer to a second communication bridge in the second network; at the second communication bridge in the second network, processing the message-type agnostic buffer based on communication mechanism parameter values corresponding to communication mechanism parameters for the second communication bridge; and based on the processing, forwarding the serialized message to the listener node in the second network.

2. The computer implemented method according to claim 1, further comprising: sniffing a registration message sent by the listener node to a communication manager in the second network; and based on the sniffing, retrieving the listener message property including a communication mechanism parameter and a message type for receiving serialized message bits at the listener node.

3. The computer implemented method according to claim 1, further comprising: receiving speaker communication property at message type-agnostic listener proxy, executing at the first network, from the speaker node; forwarding the speaker communication property to the communication broker executing at the cloud; and receiving the speaker communication property at message-type agnostic speaker proxy.

4. The computer implemented method according to claim 1, further comprising: at regular interval, synchronizing the speaker communication property at the first communication bridge in the first network based on speaker communication property published by the speaker node.

5. The computer implemented method according to claim 1, further comprising: at the first communication bridge in the first network, receiving a compression mechanism parameter to compress the serialized message bits received from speaker node; compressing the serialized message at the first network to obtain a compressed serialized message; forwarding the compression mechanism parameter to the second communication bridge at the second network; and at the second communication bridge, decompressing the compressed serialized message based on the received compression mechanism parameter to obtain the message.

6. A computer system to manage communication between a plurality of heterogeneous devices across a plurality of networks and a communication broker in a cloud, the system comprising:
one or more processors;
one or more storage devices in communication with the one or more processors, the storage devices having instructions stored thereupon which, when executed by the one or more processors, cause the one or more processors to
compare a speaker communication property of a speaker node executing in a first network with a listener communication property of a listener node executing in a second network; based on the comparison, generate a message-type agnostic listener proxy included in the first network; serialize a message at the speaker node in the first network to obtain a serialized message; copy the serialized message to a message-type agnostic buffer; add at least one or more serialized message bits to the message-type agnostic buffer; forward the serialized message included in the message-type agnostic buffer to the communication broker in the cloud; forward the serialized message included in the message-type agnostic buffer to a second communication bridge in the second network;
process the message-type agnostic buffer based on communication mechanism parameter values corresponding to communication mechanism parameters; and based on the processing, forward the serialized message to the listener node in the second network.

7. The computer system according to claim 6, wherein the one or more processors further executes the instructions to: sniff a registration message sent by the listener node to a communication manager in the second network; and based on the sniffing, retrieve the listener message property including a communication mechanism parameter and a message type for receiving the serialized message bits at the listener node.

8. The computer system according to claim 6, wherein the one or more processors further executes the instructions to: receive speaker communication property at message type-agnostic listener proxy, executing at the second network; forward the speaker communication property to the communication broker executing at the cloud; and receive the speaker communication property at message-type agnostic speaker proxy.

9. The computer system according to claim 6, wherein the one or more processors further executes the instructions to: at regular interval, synchronize the speaker communication property at the first communication bridge in the first network based on speaker communication property published by the speaker node.

10. The computer system according to claim 6, wherein the one or more processors further executes the instructions to: receive a compression mechanism parameter to compress the serialized message bits received from speaker node; compress the serialized message at the first network to obtain a compressed serialized message; forward the compression mechanism parameter to the second network; and decompress the compressed serialized message based on the received compression mechanism parameter to obtain the message.

11. The computer system according to claim 6, wherein the one or more processors further executes the instructions to: determine whether the serialized message is allowed to be forwarded as per a whitelist; and forward the serialized message when the serialized message is allowed to be forwarded as per the whitelist.

12. A non-transitory computer readable medium encoded with instructions that when executed by one or more processors causes the one or more processors to: compare a speaker communication property of a speaker node executing in a first network with a listener communication property of a listener node executing in a second network; based on the comparison, generate a message-type agnostic listener proxy included in the first network; serialize a message at the speaker node in the first network to obtain a serialized message; copy the serialized message to a message-type agnostic buffer; add at least one or more serialized message bits to the message-type agnostic buffer; forward the serialized message included in the message-type agnostic buffer to the communication broker in the cloud; forward the serialized message included in the message-type agnostic buffer to a second communication bridge in the second network; process the message-type agnostic buffer based on communication mechanism parameter values corresponding to communication mechanism parameters; and based on the processing, forward the serialized message to the listener node in the second network.

13. The non-transitory computer readable medium according to claim 12, further including instructions which when executed by the one or more processors causes the one or more processors to: sniff a registration message sent by the listener node to a communication manager in the second network; and based on the sniffing, retrieve the listener message property including a communication mechanism parameter and a message type for receiving serialized message bits at the listener node.

14. The non-transitory computer readable medium according to claim 12 further including instructions which when executed by the one or more processors causes the one or more processors to: receive a speaker communication property at a message type-agnostic listener proxy, executing at the first network, from the speaker node; forward the speaker communication property to the communication broker executing at the cloud; and receive the speaker communication property at the message-type agnostic speaker proxy.

15. The non-transitory computer readable medium according to claim 12 further including instructions which when executed by the one or more processors causes the one or more processors to: compress the serialized message bits received from speaker node based on a compression mechanism parameter; forward the compression mechanism parameter and the compressed serialized message to the second network; and decompress the compressed serialized message based on the compression mechanism parameter to obtain the message.

16. The non-transitory computer readable medium according to claim 12, further including instructions which when executed by the one or more processors causes the one or more processors to: determine whether the serialized message is allowed to be forwarded as per a whitelist; and forward the serialized message when the serialized message is allowed to be forwarded as per the whitelist.

17. The non-transitory computer readable medium according to claim 12, further including instructions which when executed by the one or more processors causes the one or more processors to: at regular interval, synchronize the speaker communication property at the first communication bridge in the first network based on speaker communication property published by the speaker node.

18. A computer implemented method for managing communication between a plurality of networks, the method comprising: comparing a speaker communication property of a speaker node executing in a first network with a listener communication property of a listener node executing in a second network; based on the comparison, generating a message-type agnostic listener proxy included in the first network; serialize a message at the speaker node in the first network to obtain a serialized message; copying the serialized message to a message-type agnostic buffer; adding at least one or more serialized message bits to the message-type agnostic buffer; forwarding the serialized message included in the message-type agnostic buffer to a communication broker in a cloud; forwarding the serialized message included in the message-type agnostic buffer to the second network; processing the message-type agnostic buffer based on communication mechanism parameter values corresponding to communication mechanism parameters; and based on the processing, forwarding the serialized message to the listener node in the second network.

19. The computer implemented method according to claim 18, further comprising: compressing the serialized message bits received from speaker node based on a compression mechanism parameter; forwarding the compression mechanism and the compressed serialized message to the second network; and decompressing the compressed serialized message based on the compression mechanism parameter to obtain the message.

20. The computer implemented method according to claim 18, further comprising: determining whether the serialized message is allowed to be forwarded as per a whitelist; and forwarding the serialized message when determining indicates that the forwarding is allowed as per the whitelist.

* * * * *